April 17, 1934.                G. A. LYON                1,955,710
TIRE COVER AND MOUNTING FOR SPARE WHEELS
Original Filed May 21, 1928
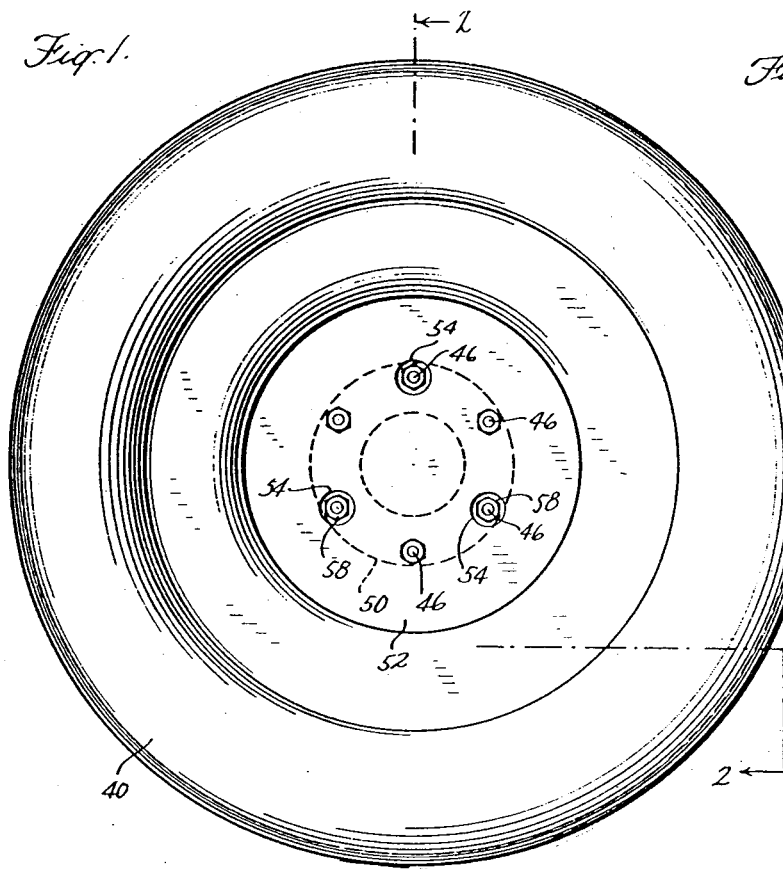
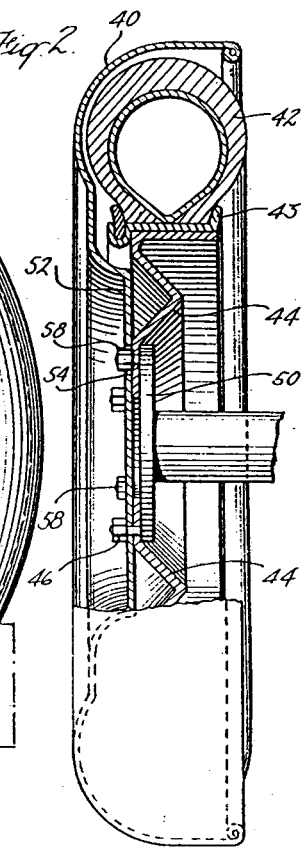
INVENTOR
GEORGE ALBERT LYON
BY
ATTORNEYS Patented Apr. 17, 1934

1,955,710

UNITED STATES PATENT OFFICE 1,955,710

TIRE COVER AND MOUNTING FOR SPARE WHEELS

George Albert Lyon, Allenhurst, N. J., assignor to Lyon, Incorporated, Asbury Park, N. J., a corporation of Delaware Original application May 21, 1928, Serial No. 279,292. Divided and this application June 15, 1929, Serial No. 371,132. In Canada May 16, 1929

21 Claims. (Cl. 150—54)

This invention relates to covers for spare tires carried upon automobiles and more specifically to a tire cover and mounting for a spare wheel.

The usual spare tire cover consists of a canvas casing coated with waterproofing material and formed to fit the contour of the spare tire and carrier. These tire covers are unattractive in appearance and are subject to shrinkage so that they are difficult to apply to a tire after having been in use for a relatively short time. Such casings also often cannot be applied to a tire so that they will fit the tire smoothly. They also wear out quickly and are readily torn, particularly when struck by another car, as often happens under congested traffic conditions. They also do not constitute a satisfactory protection for the tire against damage in case of collision. The ordinary tire cover, since it is made of a highly flexible material, not only wrinkles readily but, when applied to a tire, conforms to the projections or roughnesses on the tire so that it does not present a smooth outer surface.

The principal object of the present invention is to produce a cover for the spare tire of an automobile which has a highly attractive appearance, which may be readily applied to the tire, which is strong and durable in construction, which will protect the tire in a reliable manner against weather and damage from collision, and which will present a smooth outer surface at all times.

Another object of this invention is to provide a novel combination tire cover and mounting for a spare wheel in which the tire cover may be easily applied to and removed from the wheel mounting and in which the tire cover may be used with or without a spare tire therein, or with or without a spare wheel therein, if it is so desired.

With this and other objects in view, the invention comprises the novel and improved features, constructions and combinations of parts hereinafter described and particularly pointed out in the claims, the advantages of which will be readily understood and appreciated by those skilled in the art.

The present application constitutes a division of applicant's Patent No. 1,924,084, which issued on August 22, 1933, from application Serial No. 279,292 filed May 21, 1928.

The invention will be clearly understood from the accompanying drawing illustrating the invention in its preferred form and the following detailed description of the constructions therein shown.

In the drawing—

Figure 1 is a view in front elevation illustrating a tire cover embodying the invention applied to a tire.

Figure 2 is a view partly in side elevation and partly in section taken on the line 2—2 of Fig. 1.

The present invention embodies a tire cover made of relatively stiff sheet material formed into the proper shape to constitute a protective covering for the tire. The cover is relatively stiff so that it will maintain its shape without any inside support. The cover may be made of various materials such as hard rubber, bakelite, or cloth impregnated with stiffening material, but is preferably formed of sheet metal. In actual practice, a cover made of sheet steel has been found to give highly satisfactory results.

In the form of the invention shown in the drawing of the present application, the tire cover indicated at 40 does not rest upon or contact with the tire but is curved to conform generally to the transverse and annular curvature of the tire and extends about the same in a position slightly spaced therefrom.

The tire cover construction shown in Figures 1 and 2 is especially adapted to be used in connection with spare disc wheels to cover the tire mounted thereon. In the construction shown in these figures, the tire 42 is mounted on a rim 43 secured to a disc wheel 44. The wheel has a central aperture portion or flange 45 for use in the mounting of the wheel and which is secured by means of a series of bolts 46 to a circular plate 50 of a carrier attached to the body of the car. While my invention is illustrated in connection with a disc wheel 44, it is to be understood that the invention is not limited in use to wheels of the disc type but only in so far as defined by the annexed claims. As shown in these figures the tire cover comprises a sheet metal disc, the peripheral portion of which is curved to conform generally to the curvature of the peripheral portion of the tire so as to extend about the same in the manner shown in Figure 2. The central portion 52 of the disc is depressed, as clearly shown in this figure, so as to form an attaching portion, preferably having a flat or plane inner surface for engagement with the outer surface of the central part of the disc wheel 44. The central depressed portion of the cover is provided with a series of holes 54 to receive alternate bolts 46 and nuts 58 by which the disc wheel is secured to the plate 50. The depressed portion of the cover is provided with additional openings to receive certain of the bolts 46 on which nuts are applied to engage said portion and thereby secure the cover to the wheel.

In applying the cover 40 shown in Figures 1 and 2 to the tire, any three alternate nuts 58 are detached from the corresponding bolts 46 and the cover is located so that these bolts pass through the openings alternating with the enlarged openings 54 in the depressed portion 52 of the cover, the other nuts 58 entering said enlarged openings 54. The detached nuts 58 are then applied to said corresponding bolts and are threaded home against the cover portion 52 to secure the cover in position.

The tire cover above described has the advantages that it is strong and durable in construction and that it will efficiently protect the tire both from the weather and from injury to which the tire may be subjected in case of collision by contact of another car with the tire. The cover being made of relatively stiff sheet material will maintain its shape so that it will always present a smooth attractive outer surface. When made of sheet metal, the principal parts of the cover may be stamped out with suitable dies, thereby enabling the covers to be made in quantities at a relatively small cost. The cover may be enameled in any desired color, and when made of sheet metal may be plated with nickel. A cover of the construction shown in the drawing of this application will be highly attractive in appearance and will add greatly to the beauty of the car. The cover in each case may be quickly and easily applied to the tire and as quickly and easily detached therefrom.

It is to be understood that the invention is not limited to the particular construction of the illustrated embodiment of the invention but that the invention may be embodied in other forms within the scope of the claims.

Having explained the nature and object of the invention and having specifically described a construction embodying the invention in its preferred form, what is claimed is:

1. In a device of the class described, a tired disc wheel, a carrier therefor, a cover for the tire and having a central disc, said carrier having bolts and said discs having openings in which said bolts are received, nuts on said bolts and engaging said discs, the cover disc having enlarged bolt openings through which the wheel disc engaging nuts pass, whereby the opposite faces of the wheel disc are engaged by the cover disc and the carrier, and the cover is removable without disturbing the wheel.

2. In combination in a spare wheel assembly on an automobile, a spare wheel adapted to carry a tire and including an apertured central portion, a supporting member for the wheel and disposed in cooperation with the back of said central portion, a spare tire cover having a central apertured part, and bolt means common to both the cover and said central portion of the wheel cooperating with said apertured cover part to detachably fasten both the wheel and cover to said supporting member.

3. In combination in a spare wheel assembly on an automobile, a spare wheel adapted to carry a tire and including an apertured central portion, a supporting member for the wheel and disposed in cooperation with the back of said central portion, a spare tire cover having a central apertured part, and bolt means common to both the wheel cover and said central portion of the wheel cooperating with said apertured cover part to detachably fasten both the wheel and cover to said supporting member, said supporting means including a plate against which said wheel central portion is bolted by said bolt means and said bolt means aiding to center the cover on the wheel and forcibly drawing the cover toward the plate and into tight cooperation with said central wheel portion.

4. In combination in a spare wheel assembly on an automobile, a spare wheel adapted to carry a tire and including an apertured central portion, a supporting member for the wheel and disposed in cooperation with the back of said central portion, a spare tire cover having a central apertured part, and bolt means common to both the cover and said central portion of the wheel cooperating with said apertured cover part to detachably fasten both the wheel and cover to said supporting member, said supporting means including a plate to which said central wheel portion is secured by said bolt means and whereby said bolt means prevents turning of said cover on the wheel.

5. In combination in a spare wheel assembly on an automobile, a spare wheel adapted to carry a tire and including an apertured central portion, a supporting member for the wheel and disposed in cooperation with the back of said central portion, a spare tire cover having a central apertured part, and bolt means common to both the cover and said central portion of the wheel cooperating with said apertured cover part to detachably fasten both the wheel and cover to said supporting member, said supporting means including a plate to which said central wheel portion is secured by said bolt means and whereby said bolt means prevents turning of said cover on the wheel, said bolt means including a plurality of fastening elements arranged about the axis of the wheel.

6. In combination in a spare wheel assembly, a spare wheel and tire, a supporting member including laterally projecting stud means extending through cooperating apertures adjacent a central portion of the wheel, a spare tire cover including a side portion for disposition over an outer side wall of the wheel and tire and having a central portion apertured to accommodate said stud means for clamping said central portions of the wheel and cover to said supporting member, said stud means aiding to center the cover on the wheel and to prevent turning of the cover.

7. In combination in a spare wheel assembly, a spare wheel and tire, a supporting member including laterally projecting stud means extending through cooperating apertures adjacent a central portion of the wheel, a spare tire cover including a side portion for disposition over an outer side wall of the wheel and tire and having a central portion apertured to accommodate said stud means for clamping said central portions of the wheel and cover to said supporting member, certain of said stud means securing only the wheel to the supporting member and other of said means securing both the wheel and cover to the supporting member.

8. In combination in a spare wheel assembly, a spare wheel and tire, a supporting member including laterally projecting stud means extending through cooperating apertures adjacent a central portion of the wheel, a spare tire cover including a side portion for disposition over an outer side wall of the wheel and tire and having a central portion apertured to accommodate said stud means for clamping said central portions of the wheel and cover to said supporting member, said stud means comprising threaded shanks carried by the supporting member and nuts threaded on the free ends of the threaded shanks.

9. In combination in a spare wheel assembly, a spare wheel and tire, a supporting member including laterally projecting stud means extending through cooperating apertures adjacent a central portion of the wheel, a spare tire cover including a side portion for disposition over an outer side wall of the wheel and tire and having a central portion apertured to accommodate said stud means for clamping said central portions of the wheel and cover to said supporting member, said central portion of the cover projecting transversely inwardly of the tire and wheel to be centered and secured to said supporting member by said clamping means.

10. In combination in a spare wheel assembly, a spare wheel and tire, a supporting member including laterally projecting stud means extending through cooperating apertures adjacent a central portion of the wheel, a spare tire cover including a side portion for disposition over an outer side wall of the wheel and tire and having a central portion apertured to accommodate said stud means for clamping said central portions of the wheel and cover to said supporting member, said cover also including a tread covering portion of a size and shape whereby the cover may be readily placed on the tire.

11. In combination, in a spare wheel assembly, a wheel supporting member, a spare wheel adapted to carry a tire and having a central inner part provided with fastening means for securing the wheel to said member and an outer spare tire and wheel cover made of metallic sheet or the like and having a central part projecting transversely inwardly from the outer side portion of the cover and secured inwardly of said side portion and to the supporting member.

12. In combination, in a spare wheel assembly, a wheel supporting member, a spare wheel adapted to carry a tire and having a central inner flange provided with bolt means for securing the wheel to said member and an outer spare tire and wheel cover made of metallic sheet or the like and having a central part offset transversely inwardly from the outer side of the cover and secured inwardly of said side and to the supporting member, said outer cover side having an annular convex outer portion of a transverse curvature conforming generally to that of an outer side wall of the tire.

13. In combination, in a spare wheel assembly, a wheel supporting member, a spare wheel adapted to carry a tire and having a central inner flange provided with a plurality of fastening elements for securing the wheel to said member and an outer spare tire and wheel cover made of metallic sheet or the like and having a central part offset transversely inwardly from an outer side of the cover and secured inwardly of said side and to the supporting member by said fastening elements, said cover being supported centrally of the wheel so as not to require that a tire be on the wheel when the cover is secured in place.

14. In combination, in a spare wheel assembly, a wheel supporting member, a spare wheel adapted to carry a tire and having a central inner flange provided with bolt means for securing the wheel to said member and an outer spare tire and wheel cover made of metallic sheet or the like and having its central portion secured to said flange by said bolt means.

15. In combination, in a spare wheel assembly, a wheel supporting member, a spare wheel adapted to carry a tire and having a central inner flange provided with bolt means for securing the wheel to said member and an outer spare tire and wheel cover made of metallic sheet or the like and having a central part offset transversely inwardly from an outer side of the cover and secured to said flange, said cover also having a tread covering portion extending over the tread of the tire and provided with an inturned rear part adjacent the rear side of the tire.

16. In combination, in a spare wheel assembly, a wheel supporting member, a spare wheel adapted to carry a tire and having a central inner flange provided with bolt means for securing the wheel to said member and an outer spare tire and wheel cover made of metallic sheet or the like and having a central part offset transversely inwardly of the outer side of the cover and additional bolt means for securing said off-set cover part centrally of and to said member independently of the securing of said wheel to said member so that said cover may be secured to said supporting member with or without a spare wheel therein.

17. In combination, in a spare wheel assembly, a wheel supporting member, a spare wheel adapted to carry a tire and having a central inner part provided bolt means for holding the wheel on said member and an outer spare tire and wheel cover made of metallic sheet or the like and having a central part projecting transversely inwardly of an outer side portion of the cover, said cover part including means for limiting movement of the cover inwardly toward said member and fastening means for exerting a holding pressure on said cover part to secure said cover centrally of and to said supporting member independently of the holding of said wheel on said member so that said wheel may be first held in position on said member and said cover may be thereafter secured in proper position on the wheel by said fastening means.

18. In combination, in a spare wheel assembly, a wheel supporting member, a spare wheel adapted to carry a tire and having a central inner part provided with fastening elements for securing the wheel to said member and an outer spare tire and wheel cover made of metallic sheet or the like and having a central part projecting transversely inwardly of an outer side portion of the cover, said fastening elements exerting a clamping pressure on said cover part to draw the cover inwardly into holding position on spare wheel and to secure the cover centrally of and to said member so that said cover may be secured in position with or without a spare wheel therein.

19. In combination, a member for centrally supporting a spare wheel, a spare wheel adapted to carry a tire and having a central apertured portion adapted to be held by fastening means, a cover for the outer exposed portion of the tire and wheel made of sheet metal or the like and including a tread covering portion and an outer tire side wall covering portion, and having a central portion extending transversely inwardly from the outer side portion of the cover for holding cooperation with fastening means, and a plurality of fastening means for centrally securing said apertured wheel portion and central cover portion to the supporting member.

20. In combination, a member for centrally supporting a spare wheel, a spare wheel adapted to carry a tire and having a central apertured portion adapted to be held by fastening means, a cover for the outer exposed portion of the tire and wheel made of sheet metal or the like, and including a tread covering portion and an outer tire side wall covering portion, and having a central portion extending transversely inwardly from the outer side portion of the cover for holding cooperation with fastening means, and a plurality of fastening means for centrally securing said apertured wheel portion and central cover portion to the supporting member, certain of said fastening means holding only the wheel in place independently of the cover fastening means so that the cover may be removed without loosening the wheel.

21. In combination, a member for centrally supporting a spare wheel, a spare wheel adapted to carry a tire and having a central apertured portion adapted to be held by fastening means, a cover for the outer exposed portion of the tire and wheel made of sheet metal or the like and including a tread covering portion and an outer tire side wall portion, and having a central portion extending transversely inwardly from the outer side portion of the cover for holding cooperation with fastening means, the outer side portion of the cover being provided at its center with a covering portion for said apertured wheel portion, and a plurality of fastening means for centrally securing said apertured wheel portion and central cover portion to the supporting member, certain of said fastening means holding only the wheel in place independently of the cover fastening means so that the cover may be removed without loosening the wheel.

GEORGE ALBERT LYON.